US012501535B2

(12) United States Patent
Huh

(10) Patent No.: US 12,501,535 B2
(45) Date of Patent: Dec. 16, 2025

(54) PLASMA UNIFORMITY CONTROL SYSTEM USING MULTI-PULSING AND CONTROL METHOD THEREOF

(71) Applicant: KOREA ATOMIC ENERGY RESEARCH INSTITUTE, Daejeon (KR)

(72) Inventor: Sung Ryul Huh, Sejong-si (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 52 days.

(21) Appl. No.: 18/683,553

(22) PCT Filed: Jul. 25, 2022

(86) PCT No.: PCT/KR2022/010856
§ 371 (c)(1),
(2) Date: Feb. 14, 2024

(87) PCT Pub. No.: WO2023/043042
PCT Pub. Date: Mar. 23, 2023

(65) Prior Publication Data

US 2024/0381516 A1 Nov. 14, 2024

(30) Foreign Application Priority Data

Sep. 17, 2021 (KR) ........................ 10-2021-0125123

(51) Int. Cl.
*H05H 1/00* (2006.01)

(52) U.S. Cl.
CPC .................................... *H05H 1/01* (2021.05)

(58) Field of Classification Search
CPC ........... H01J 37/32357; H01J 37/32422; H01J 37/32541; H01J 37/32568; H01J 37/32; H05H 1/01
See application file for complete search history.

(56) References Cited

U.S. PATENT DOCUMENTS 5,711,812 A * 1/1998 Chapek ............ H01J 37/32697 118/723 E
2003/0079983 A1 5/2003 Long et al.
(Continued)

FOREIGN PATENT DOCUMENTS

EP 3712921 9/2020
JP H04-334847 11/1992
(Continued)

OTHER PUBLICATIONS

KIPO, PCT Search Report & Written Opinion of PCT/KR2022/010856 dated Nov. 1, 2022.
(Continued)

*Primary Examiner* — Patrick C Chen
(74) *Attorney, Agent, or Firm* — LEX IP MEISTER, PLLC

(57) ABSTRACT

A system for controlling plasma uniformity according to an embodiment includes a plasma generator configured to generate plasma by applying pulsed power to a plasma source gas, an ion supply unit connected to the plasma generator and configured to receive and accommodate the plasma generated by the plasma generator, a plurality of segmented electrodes positioned inside or below the ion supply unit and configured to be electrically isolated from each other and individually biased at voltages, and a controller configured to control the amount of supply of ions moving from the ion supply unit to the plurality of segmented electrodes.

14 Claims, 16 Drawing Sheets

(56) References Cited

U.S. PATENT DOCUMENTS

| | | | | |
|---|---|---|---|---|
| 2004/0016402 | A1 | 1/2004 | Walther et al. | |
| 2005/0211546 | A1 | 9/2005 | Hanawa et al. | |
| 2019/0237300 | A1 | 8/2019 | Ikeda et al. | |
| 2020/0288561 | A1* | 9/2020 | Huh | H01J 37/32146 |

FOREIGN PATENT DOCUMENTS

| | | | | | |
|---|---|---|---|---|---|
| JP | H09-129152 | | | 5/1997 | |
| JP | 2008-305666 | | | 12/2008 | |
| JP | 2019-134021 | | | 8/2019 | |
| JP | 2021-503691 | | | 2/2021 | |
| KR | 10-0395272 | | | 11/2003 | |
| KR | 10-0485034 | | | 4/2005 | |
| KR | 10-2009-0015392 | | | 2/2009 | |
| KR | 20090015392 | A | * | 2/2009 | H01J 37/32192 |
| KR | 10-1328800 | | | 11/2013 | |
| KR | 10-1465542 | | | 11/2014 | |
| KR | 10-1886755 | | | 8/2018 | |
| KR | 10-2020-0032276 | | | 3/2020 | |
| KR | 20200032276 | A | * | 3/2020 | C23C 14/566 |

OTHER PUBLICATIONS

EPO, Search Report of EP 22870129.8 dated Oct. 10, 2025, total 13 pages.

* cited by examiner

PLASMA UNIFORMITY CONTROL SYSTEM USING MULTI-PULSING AND CONTROL METHOD THEREOF

TECHNICAL FIELD

Provided is a system and method for controlling plasma uniformity using multi-pulsing.

BACKGROUND ART

Plasma is defined as an electrically quasi-neutral medium of ionized gases or particles when energy is added to a gas, and may include neutral particles, electrons, ions, radicals, and the like. Here, the electrons have a population distribution as a function of the electron energy and may be classified into high-energy electrons and low-energy electrons depending on their energy levels.

Ion source technologies including negative ion sources are actively used in various technical fields, particularly, nuclear fusion, semiconductors, and aerospace. Examples include a neutral beam injection device for a nuclear fusion reactor system in the nuclear fusion field, a plasma dry etching process technology in the semiconductor field, and an ion thruster as a spacecraft propulsion system in the aerospace field.

In the ion source technologies, there are a number of mechanisms of the negative ion generation including the surface production mechanism, in which negative ions are produced on ion source surfaces coated with a low work function material, and the volume production mechanism in which highly vibrationally excited molecules are produced due to collisions with high-energy electrons and then negative ions are generated by collisions of the highly vibrationally excited molecules with low-energy electrons.

In the field of ion source, a plasma pulsing technology is used for various purposes including for promoting the efficiency of the negative ion formation. In addition, a multi-pulsed plasma source technology has been studied. The technology may continuously supply plasma ions produced by the pulsing and enable the amount of supplied ions to be controlled depending on the user setting.

In the field of ion source, there is a need for a technology capable of controlling large-area uniformity to maximize the utilization of the multi-pulsed plasma source technology.

As related documents, Korean Patent No. 10-1886755 discloses a system and method for continuously supplying negative ions using multi-pulsed plasma sources, Korean Patent No. 10-1465542 discloses a plasma process and process control with enhanced charge neutralization, Korean Patent No. 10-0485034 discloses a plasma treatment system and method, and Korean Patent No. 10-1328800 discloses a method of controlling properties of pulsed plasma using RF pulsed power with multiple frequencies.

DISCLOSURE

Technical Problem

The present disclosure attempts to control large-area uniformity while continuously supplying ions formed by pulsed plasma.

The present disclosure attempts to shape a profile of the amount of ion supply versus time graph by controlling temporal variation in amount of ions formed and supplied from pulsed plasma.

The present disclosure attempts to apply to various technologies including a neutral beam injection device of a nuclear fusion reactor system, a plasma dry etching process technology, and an ion thruster of a spacecraft propulsion system.

The embodiment according to the present disclosure may be used to achieve not only the above-mentioned object but also other objects that are not specifically mentioned above.

Technical Solution

A system for controlling plasma uniformity according to an embodiment includes a plasma generator configured to generate plasma by applying pulsed power to a plasma source gas, an ion supply unit connected to the plasma generator and configured to receive and accommodate the plasma created by the plasma generator, a plurality of segmented electrodes positioned inside or below the ion supply unit and configured to be electrically isolated from each other and individually biased at voltages, and a controller configured to control the amount of ion supply of ions moving from the ion supply unit to the plurality of segmented electrodes.

A system for controlling plasma uniformity according to another embodiment includes: a first plasma generator configured to generate first plasma by applying first pulsed power to a first plasma source gas; a second plasma generator configured to generate second plasma by applying second pulsed power, whose pulse has a phase difference with respect to the first pulsed power pulse, to a second plasma source gas; an ion supply unit positioned between the first plasma generator and the second plasma generator, connected to the first plasma generator and the second plasma generator, and configured to receive and accommodate the first plasma and the second plasma; a first segmented electrode configured to be biased at a first voltage; and a second segmented electrode configured to be biased at a second voltage, positioned to be farther from the first plasma generator than the first segmented electrode, and positioned to be closer to the second plasma generator than the first segmented electrode. During an after-glow period of the first plasma generator, the first voltage is more negative with respect to the second voltage, and the second plasma generator is in an active-glow period.

A method of controlling plasma uniformity according to still another embodiment includes: measuring a distribution of an amount of ion supply or an amount of ion supply for each position in an ion supply unit or an ion processing unit corresponding to each segmented electrode at a specific time point after plasma created by a plasma generator is transported (or diffuses) to the ion supply unit; applying, by a controller, voltages individually to a plurality of segmented electrodes that is electrically isolated from each other; and determining whether the distribution of the amount of ion supply or the amount of ion supply for each position in the ion supply unit or the ion processing unit at the specific time point conforms to a user's design based on changes in voltages of the plurality of segmented electrodes.

Advantageous Effects

According to the embodiment, the ions, which are generated by plasma pulsing, may be continuously supplied with a uniform or desired distribution for the large-area application, the shaping the profile of the amount of ion supply versus time may be implemented by controlling temporal variation in the amount of the supplied ions, and the embodiment may be applied to various technologies including the neutral beam injection device of the nuclear fusion reactor system, the plasma dry etching process, and the ion thruster of the spacecraft propulsion system.

MODE FOR INVENTION

Figure 1A:
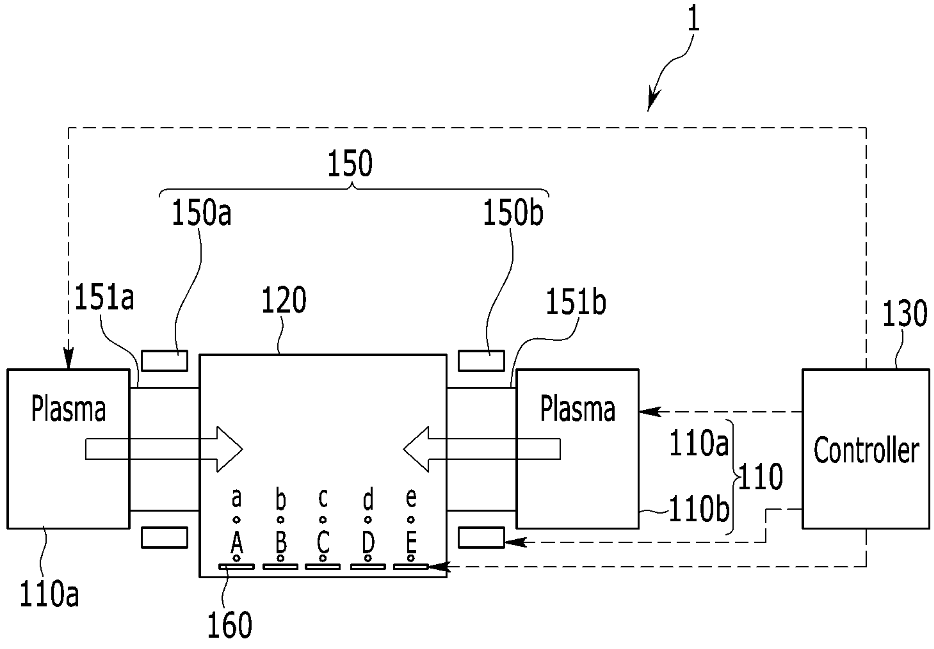
FIG. 1A is a cross-sectional view schematically illustrating a system for controlling plasma uniformity using multi-pulsing according to the embodiment.

Embodiments of the present disclosure will be described in detail with reference to the accompanying drawings so that those with ordinary skill in the art to which the present disclosure pertains may easily carry out the embodiments. The present disclosure may be implemented in various different ways, and is not limited to the embodiments described herein. In the drawings, a part irrelevant to the description will be omitted to clearly describe the present disclosure, and the same or similar constituent elements will be designated by the same reference numerals throughout the specification. In addition, a specific description of well publicly-known technologies will be omitted.

Throughout the specification, unless explicitly described to the contrary, the word “comprise/include” and variations such as “comprises/includes” or “comprising/including” will be understood to imply the inclusion of stated elements, not the exclusion of any other elements.

Throughout the specification, the amount of ion supply includes both ion density and ion flux.

Throughout the specification and drawings, points A to E and points a to e mean surfaces of an object or spaces at the corresponding points.

Throughout the specification and drawings, the system for controlling plasma uniformity according to the embodiment may additionally include constituent elements of the system disclosed in Korean Patent No. 10-1886755, as necessary.

Then, the system and method for controlling plasma uniformity using multi-pulsing according to the embodiment will be described.

Figure 1B:
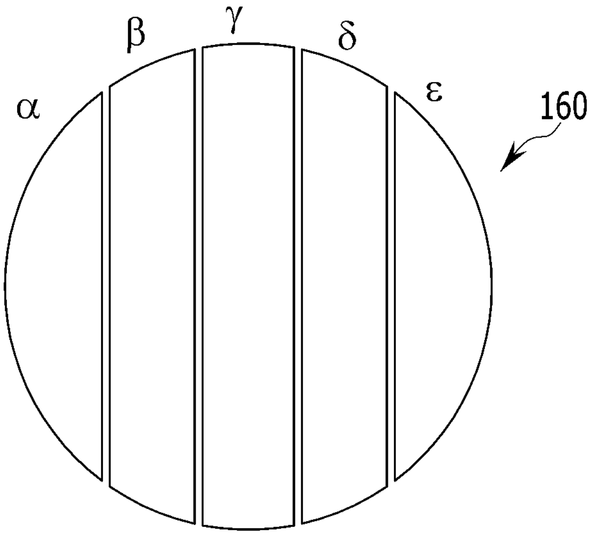
FIG. 1B is a top plan view illustrating a plurality of segmented electrodes in the system depicted in FIG. 1A.
Figure 1C:
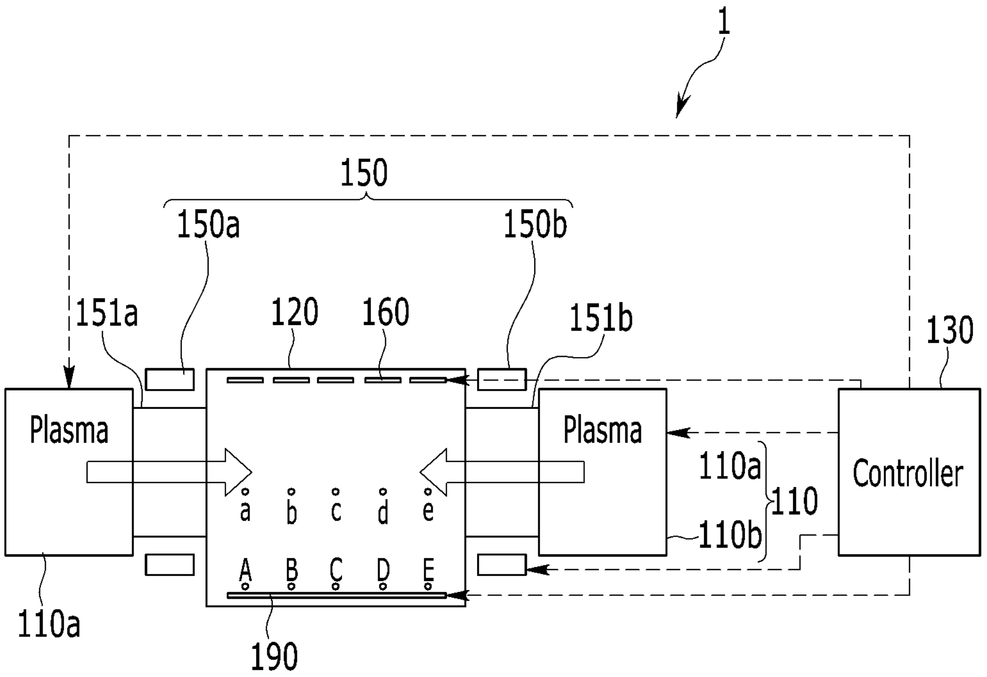
FIG. 1C is a cross-sectional view schematically illustrating a system for controlling plasma uniformity using multi-pulsing according to the embodiment.
Figure 2A:
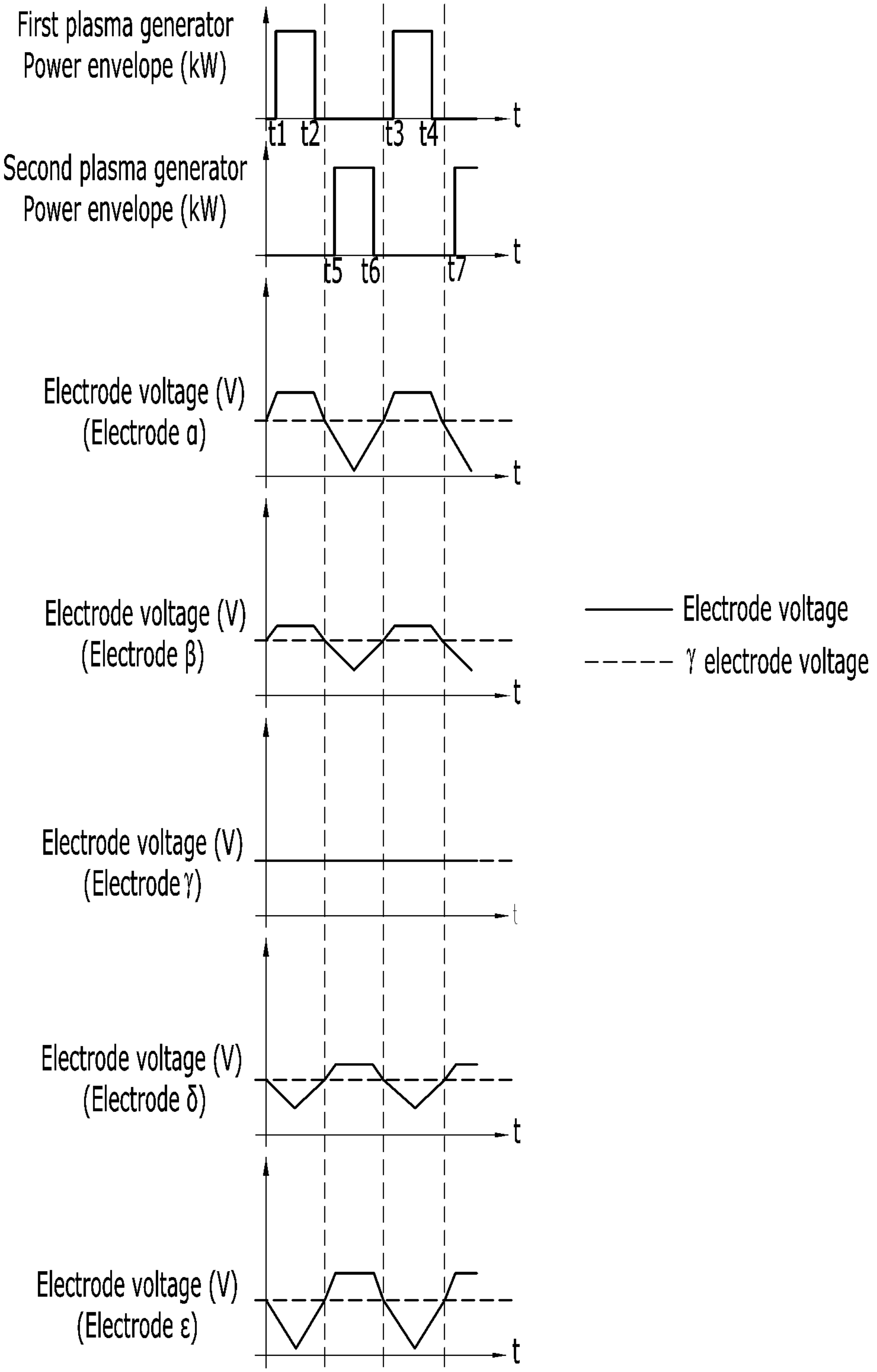
FIG. 2A is a graph illustrating profiles of pulsed powers delivered to a plurality of plasma generators and profiles of time-varying voltages applied to a plurality of segmented electrodes in the system for controlling plasma uniformity using multi-pulsing displayed in FIG. 1A.
Figure 3A:
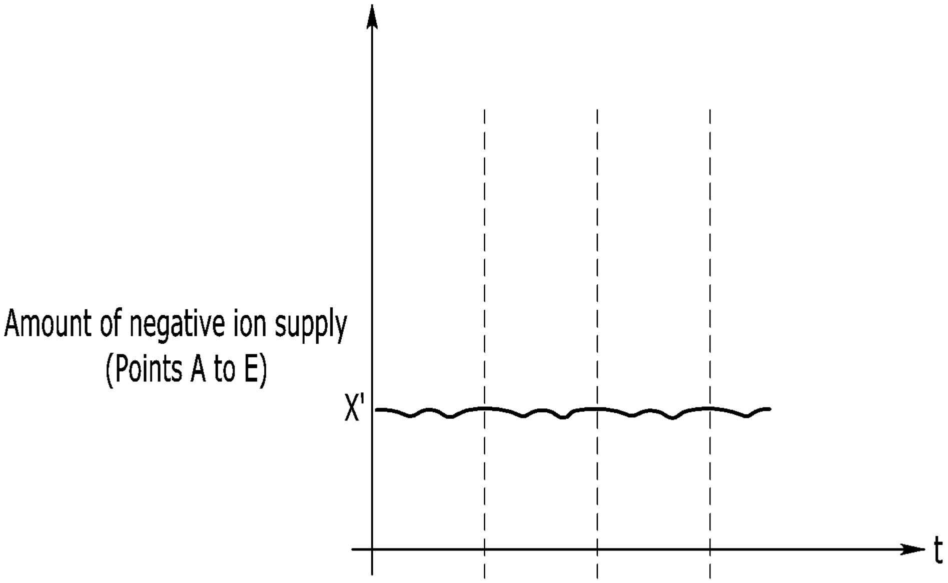
FIG. 3A is a graph illustrating an amount of negative ion supply over time at positions (A-E) when pulsed powers and electrode voltages preset as given in FIG. 2A are applied in the system shown in FIG. 1A.
Figure 3B:
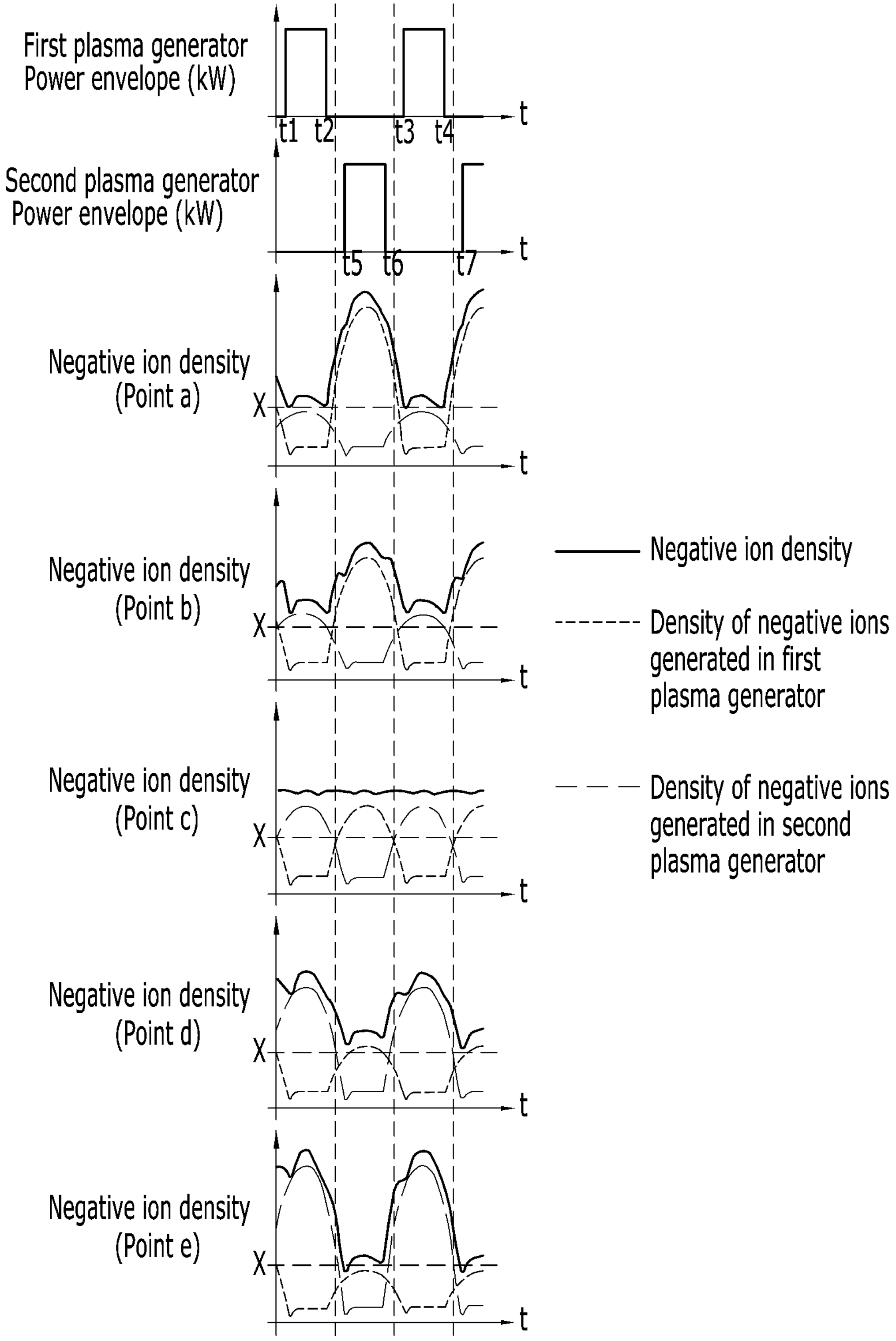
FIG. 3B is a graph illustrating time evolutions of negative ion densities at positions (a-e) in an ion supply unit when pulsed powers preset as given in FIG. 2A are delivered in the system shown in FIG. 1A.

FIG. 1A is a cross-sectional view schematically illustrating a system for controlling plasma uniformity using multi-pulsing according to the embodiment, FIG. 1B is a top plan view illustrating a plurality of segmented electrodes in the system depicted in FIG. 1A, and FIG. 1C is a cross-sectional view schematically illustrating a system for controlling plasma uniformity using multi-pulsing according to the embodiment. FIG. 2A is a graph illustrating profiles of pulsed powers delivered to a plurality of plasma generator and profiles of time-varying voltages applied to a plurality of electrodes in the system for controlling plasma uniformity using multi-pulsing displayed in FIG. 1A. For example, in this case, the time-varying voltage profiles are to provide a target amount of negative ion supply X' at positions A to E on the electrode or substrate for a uniform distribution in FIG. 3A or a target negative ion density X in FIG. 3B corresponding to X' for a uniform distribution. FIG. 3A is a graph illustrating an amount of negative ion supply over time at positions (A-E) when pulsed powers and electrode voltages preset as given in FIG. 2A are applied in the system shown in FIG. 1A. Because the target amounts of negative ion supply at positions (A-E) are the same as X', the distribution of the target amount of negative ion supply is a uniform distribution. FIG. 3B is a graph illustrating time evolutions of negative ion densities at positions (a-e) when the ion flux is not controlled by the plurality of segmented electrodes or when the same voltage is applied to the plurality of segmented electrodes. In this case, when it is intended to equally provide the amount of ion supply (or flux) X' for positions A to E on the electrode or substrate, X is a target negative ion density at positions a to e corresponding to the positions A to E.

With reference to FIGS. 1A and 1B, a system 1 for controlling plasma uniformity using multi-pulsing includes a plasma generator 110, an ion supply unit 120, a plurality of segmented electrodes 160, and a controller 130.

The system 1 for controlling plasma uniformity may control uniformity of the amount of ion supply at various positions over a large area by adjusting voltages individually applied to the plurality of segmented electrodes 160 by the controller 130. For example, the amounts of ion supply at points A to E may be substantially equal to one another. Alternatively, the distribution of the amounts of ion supply at points A to E may have various shapes, such as a bell shape, a double-horn shape, skewed shape with a slope, and the like, taken as a whole.

The plasma generator 110 may include a plurality of plasma generators 110*a* and 110*b* and be controlled by the controller 130. The plasma generator 110 may include additional components, such as an impedance matcher, a power supply device, and an antenna, required to generate plasma, as necessary. In addition, the plasma generator 110 may be supplied with a gas by a gas supply unit. The plasma generator 110 may include two or more plasma generators, as necessary. With reference to FIG. 2A, the plurality of plasma generators 110*a* and 110*b* each generate plasma by applying pulsed power to a plasma source gas with a phase difference between their respective pulses. Therefore, at a particular position in the ion supply unit 120 displayed in FIG. 1A, ions at a particular density may be continuously and time-independently supplied. The continuous supply of the ions in the pulsed plasma may be achieved by multi-plasma pulsing in the system 1, and the system 1 may be provided to devices that require a constant or continuous supply of ions over time and its utilization.

For example, the plasma source gas may include an electronegative gas capable of producing negative ions in a plasma state. In the case that the plasma source gas includes the electronegative gas, the generated plasma may include negative ions, highly vibrationally excited molecules, i.e., negative ion precursors, high-energy electrons, and low-energy electrons.

The pulsed power means time-modulating power that generates a pulsed plasma and includes both an ON state, in which power is deposited, and an OFF state in which power is not deposited. The ON state or the duration for which power is deposited is referred to as an active-glow, and the OFF state or the duration for which power is not deposited is referred to as an after-glow. For example, with reference to FIG. 3B, in a first plasma generator 110*a*, a time period of $t_1$–$t_2$ and a time period of $t_3$–$t_4$ are the active-glow, and a time period of $t_2$–$t_3$ is the after-glow. In a second plasma generator 110*b*, a time period of $t_5$–$t_6$ is the active-glow, and a time period of $t_6$–$t_7$ is the after-glow.

In the case of the active-glow, because there are abundant high-energy electrons involved in the generation of highly vibrationally excited molecules and the destruction of negative ions due to power deposition in the ON state, the highly vibrationally excited molecule density is high, but the negative ion density is lower than that in the after-glow. In the case of the after-glow, there are few high-energy electrons involved in the destruction of negative ions, and the highly vibrationally excited molecule density and the low-energy electron density are maintained at a level capable of generating sufficient negative ions. Therefore, the negative ion density is higher than that in the active-glow. Thereafter, the negative ion density gradually decreases due to consumption of the low-energy electrons and highly vibrationally excited molecules through the negative ion generation reaction, and the like. Therefore, in the case that the plurality of plasma generators 110*a* and 110*b* is connected to the ion supply unit 120, when the amount of negative ion supply of one plasma generator 110 in the active-glow gets reduced, the plasma state in another plasma generator 110 can be switched to the after-glow to produce new negative ions for compensating for the reduction. By doing so, at a particular position in the ion supply unit 120, the total amount of negative ions, which are supplied from the plurality of plasma generators 110*a* and 110*b*, may be constantly maintained over time. For example, because the density of negative ions generated in the after-glow is high, the amount of negative ion supply, which is reduced in the active-glow (time period of $t_3$–$t_4$ at point c in FIG. 3B) of the first plasma generator 110*a*, may be compensated by supplying the negative ions generated in the after-glow (the same time period at point c in FIG. 3B) of the second plasma generator 110*b*.

The plurality of plasma generators 110*a* and 110*b* may each include an inductively coupled plasma (ICP) device, an electron cyclotron resonance plasma (ECR) plasma device, a microwave plasma device, a filament discharge plasma device, a radio frequency plasma device, a helicon plasma device, a capacitively coupled plasma (CCP) device, and the like. The plurality of plasma generators 110*a* and 110*b* may be identical to or different from one another and include plasma devices with various combinations.

The plasma created in each of the plurality of plasma generators 110*a* and 110*b* is transported (or diffuses) to the ion supply unit 120 connected to the plurality of plasma generators 110*a* and 110*b*. For example, the ion supply unit 120 may receive the negative ions generated in the plasma generator 110 and accommodate the negative ions. In addition, the ion supply unit 120 may include a space in which negative ions are produced by reactions of the negative ion precursors received from the plasma generator 110 with low-energy electrons.

The plurality of segmented electrodes 160 may be positioned near a lower end of the ion supply unit 120. For example, the plurality of segmented electrodes 160 may be employed in a semiconductor process that uses a large-area substrate. Therefore, the ions may be supplied to the substrate while the desired amount of ion supply, ion distribution, ion energy, and the like are properly controlled. The plurality of segmented electrodes 160 may be electrically isolated from each other, be configured as various numbers of segmented electrodes, and have various shapes.

The plurality of segmented electrodes 160 may be substantially positioned on the same plane or curved surface. Diverse profiles of time-varying voltages may be individually applied to the plurality of segmented electrodes 160 by the controller 130, and each of the plurality of segmented electrodes 160 may be biased at a different electric potential. By setting differences between the bias potentials of the plurality of segmented electrodes 160 and plasma space potentials in the ion supply unit 120 adjacent to the corresponding segmented electrodes to be different, the flux of the ions moving from the adjacent internal space of the ion supply unit 120 to each of the plurality of segmented electrodes 160 may be individually controlled. Because the distances from the plurality of plasma generators 110*a* and 110*b* are different from one another for positions (a-e) in the ion supply unit 120, the ion density distribution has non-uniformity (see FIG. 3B) that the amounts of ion supply are varied with position and time. This non-uniformity may lead to the non-uniformity of the ion flux distribution on the segmented electrodes 160. In this case, the non-uniformity of the ion flux distribution may be mitigated by controlling the ion flux or, instead, the distribution may be adjusted to have a particular shape at a specific time point by a user's design.

As an example, related to controlling the negative ions to have a uniform distribution, with reference to FIG. 2A, at a particular after-glow time point $(t_2+t_3)/2$ of the first plasma generator 110*a*, as each of the plurality of segmented electrodes 160 is positioned closer to the first plasma generator 110*a*, the respective bias potential may be controlled to be relatively more negative (−). For example, the respective bias potential may be controlled to be relatively more negative (−) in the order of segmented electrode ε, segmented electrode δ, segmented electrode γ, segmented electrode β, and segmented electrode α. In addition, at a particular after-glow time point $(t_6+t_7)/2$ of the second plasma generator 110*b*, as each of the plurality of segmented electrodes 160 is positioned closer to the second plasma generator 110*b*, the respective bias potential may be controlled to be relatively more negative (−). For example, the respective bias potential may be controlled to be relatively more negative in the order of segmented electrode α, segmented electrode β, segmented electrode γ, segmented electrode δ, and segmented electrode ε.

With reference to FIG. 3B, at the particular after-glow time point $((t_2+t_3)/2)$ of the first plasma generator 110*a*, because point a is closer to the first plasma generator 110*a*, in which a large number of negative ions and negative ion precursors are generated, than point c, the amount of ions (flux) corresponding to the ions that reaches point a is larger than the amount of ions (flux) corresponding to the ions that reaches point c. Further, if the ion flux is not controlled by the plurality of segmented electrodes 160 or the same voltage is applied to the plurality of segmented electrodes 160, the amount of ions (flux) corresponding to the ions that reaches point A is also larger than the amount of ions (flux) corresponding to the ions that reaches point C. In this regard, if the bias potential of segmented electrode α is much more negative than that of segmented electrode γ at the particular after-glow time point $((t_2+t_3)/2)$, the change in flux of the negative ions moving from point a to point A gets smaller than that from point c to point C due to the corresponding change in the electric field distribution. In addition, the negative ion density at point a is higher than the negative ion density at point c. Consequently, the negative ion flux at points A and C may be controlled to be equal to X', as illustrated in FIG. 3A. On the contrary, at the particular after-glow time point $((t_2+t_3)/2)$ of the first plasma generator 110*a*, because point e is farther to the first plasma generator 110*a* than point c, the amount of ions (flux) corresponding to the ions that reaches point e from the first plasma generator 110*a* is smaller than the amount of ions (flux) corresponding to the ions that reaches point c. If the ion flux is not controlled by the plurality of segmented electrodes 160 or the same voltage is applied to the plurality of segmented electrodes 160, the negative ion flux at point E may also be smaller than the negative ion flux at point C. In this regard, by allowing the bias potential of segmented electrode ε to be much more positive than that of segmented electrode γ at the particular after-glow time point $((t_2+t_3)/2)$, the change in flux of the negative ions moving from point e to point E can be larger than that from point c to point C. In addition, the negative ion density at point e is lower than the negative ion density at point c. Consequently, the amount of ion supply corresponding to the ions that reaches point E from the first plasma generator 110*a* and the amount of ion supply corresponding to the ions that reaches point C may be controlled to be substantially equal to X'. In the same way, the amounts of ion supply at points B and D may also be controlled by adjusting the bias potentials of segmented electrodes β and δ. In addition, in the similar way, as illustrated in FIG. 3A, the amounts of ion supply corresponding to the ions that reaches points A to E may be controlled to be substantially equal to X' by adjusting the voltages applied to the corresponding segmented electrodes at the particular after-glow time point $(t_6+t_7)/2$ of the second plasma generator 110*b*.

Figure 4A:
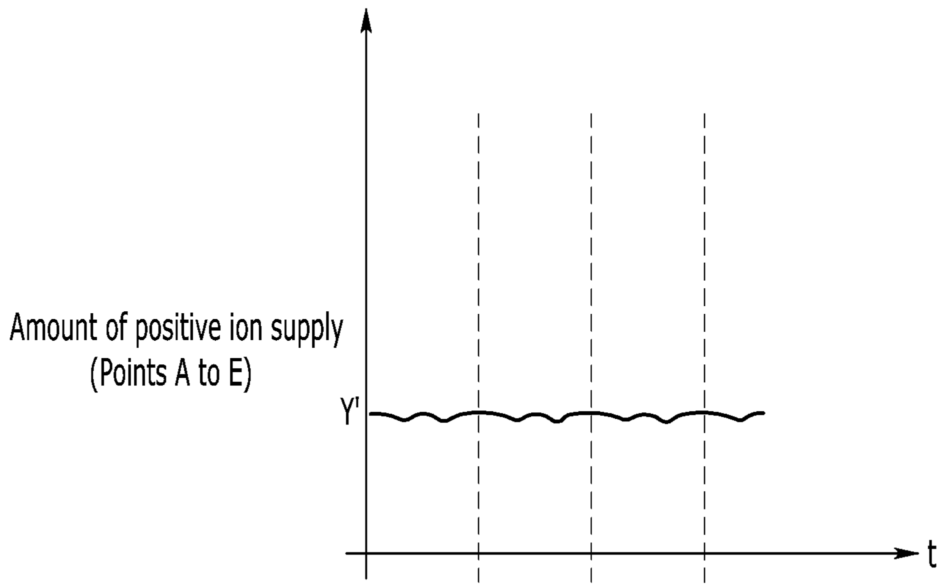
FIG. 4A is a graph illustrating an amount of positive ion supply over time at positions (A-E) when pulsed powers and electrode voltages preset as given in FIG. 2B are applied in the system shown in FIG. 1A.

An example related to the controlling the positive ions to have a uniform distribution will be described below with reference to FIGS. 2B, 4A, and 4B.

Figure 2B:
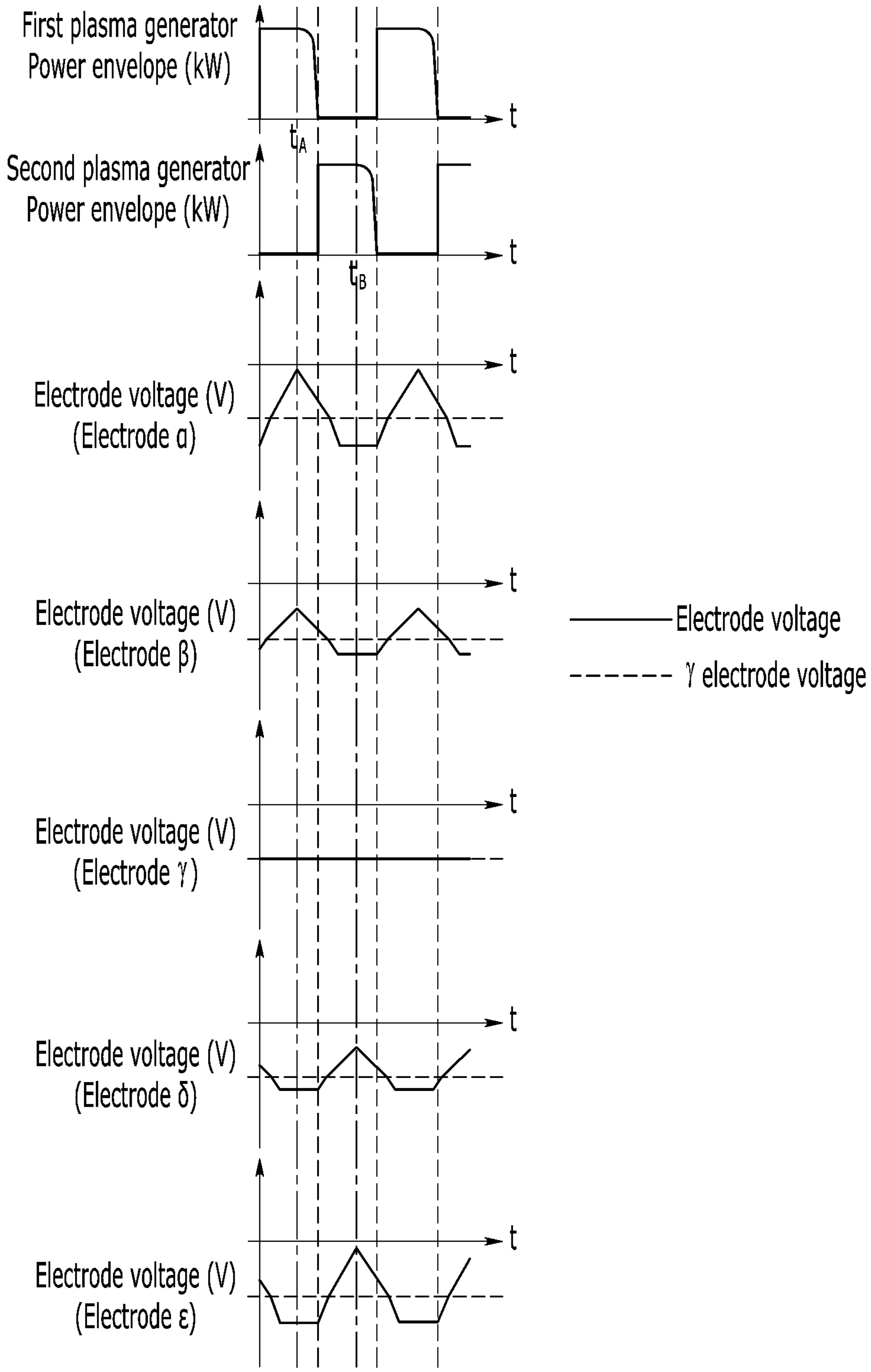
FIG. 2B is a graph illustrating profiles of pulsed powers delivered to a plurality of plasma generators and profiles of time-varying voltages applied to a plurality of segmented electrodes in the system for controlling plasma uniformity using multi-pulsing displayed in FIG. 1A.

FIG. 2B is a graph illustrating profiles of pulsed powers delivered to a plurality of plasma generators and profiles of time-varying voltages applied to a plurality of segmented electrodes in the system for controlling plasma uniformity using multi-pulsing displayed in FIG. 1A. Here, the profiles are different from those illustrated in FIG. 2A. For example, in this case, the time-varying voltage profiles are to provide a target amount of positive ion supply Y' at positions A to E on the electrode or substrate for a uniform distribution in FIG. 4A or a target positive ion density Y in FIG. 4B corresponding to Y' for a uniform distribution. FIG. 4A is a graph illustrating an amount of positive ion supply over time at positions (A-E) when pulsed powers and electrode voltages preset as given in FIG. 2B are applied in the system shown in FIG. 1A. In this case, because the target amounts of positive ion supply at positions (A-E) are the same as Y', the distribution of the target amount of positive ion supply is a uniform distribution. FIG. 4B is a graph illustrating time evolutions of positive ion densities at positions (a-e) in the ion supply unit when the ion flux is not controlled by the plurality of segmented electrodes or when the same voltage is applied to the plurality of segmented electrodes in the case that the pulsed power profiles in FIG. 2B is applied to the system displayed in FIG. 1A. Here, when it is intended to equally provide the amount of ion supply (or flux) Y' for positions A to E on the electrode or substrate, Y is a target positive ion density at positions a to e corresponding to the positions A to E.

At a particular active-glow time point $t_A$ (see FIG. 2B) of the first plasma generator 110*a*, as each of the plurality of segmented electrodes 160 is positioned closer to the first plasma generator 110*a*, the respective bias potential may be controlled to be relatively more positive (+). For example, the respective bias potential may be controlled to be relatively more positive (+) in the order of segmented electrode ε, segmented electrode δ, segmented electrode γ, segmented electrode β, and segmented electrode α. In addition, at a particular active-glow time point $t_B$ of the second plasma generator 110*b*, as each of the plurality of segmented electrodes 160 is positioned closer to the second plasma generator 110*b*, the bias potential may be controlled to be relatively more positive (+). For example, the respective bias potential may be controlled to be relatively more positive (+) in the order of segmented electrode α, segmented electrode β, segmented electrode γ, segmented electrode δ, and segmented electrode ε.

Figure 4B:
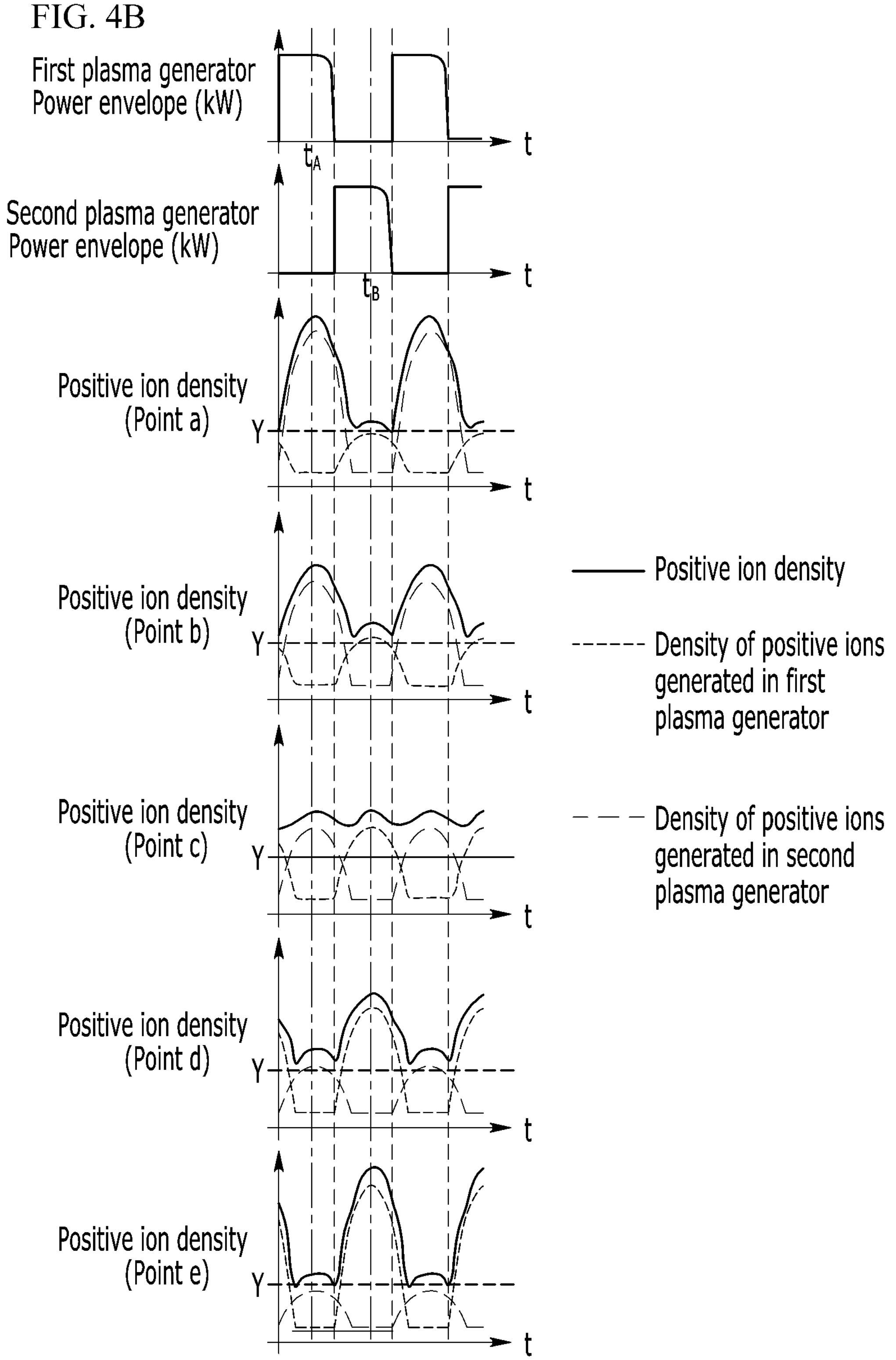
FIG. 4B is a graph illustrating time evolutions of positive ion densities at positions (a-e) in an ion supply unit when pulsed powers preset as given in FIG. 2B are delivered in the system shown in FIG. 1A.

With reference to FIG. 4B, at the particular active-glow time point $t_A$ of the first plasma generator 110*a*, because point a is closer to the first plasma generator 110*a*, in which a large number of positive ions are generated, than point c, the amount of ions (flux) corresponding to the ions that reaches point a is larger than the amount of ions (flux) corresponding to the ions that reaches point c. Further, if the ion flux is not controlled by the plurality of segmented electrodes 160 or the same voltage is applied to the plurality of segmented electrodes 160, the amount of ions (flux) corresponding to the ions that reaches point A is also larger than the amount of ions (flux) corresponding to the ions that reaches point C. In this regard, if the bias potential of segmented electrode α is much more positive than that of segmented electrode γ at the particular active-glow time point $t_A$, the change in flux of the positive ions moving from point a to point A gets smaller than that from point c to point C due to the corresponding change in the electric field distribution. In addition, the positive ion density at point a is higher than the positive ion density at point c. Consequently, the positive ion flux at points A and C may be controlled to be equal to Y', as illustrated in FIG. 4A. On the contrary, at the particular active-glow time point $t_A$ of the first plasma generator 110*a*, because point e is farther to the first plasma generator 110*a* than point c, the amount of ions (flux) corresponding to the ions that reaches point e from the first plasma generator 110*a* is smaller than the amount of ions (flux) corresponding to the ions that reaches point c. If the ion flux is not controlled by the plurality of segmented electrodes 160 or the same voltage is applied to the plurality of segmented electrodes 160, the positive ion flux at point E may also be smaller than the positive ion flux at point C. In this regard, by allowing the bias potential of segmented electrode ε to be much more negative than that of segmented electrode γ at the particular active-glow time point $t_A$, the change in flux of the positive ions moving from point e to point E can be larger than that from point c to point C. In addition, the positive ion density at point e is lower than the positive ion density at point c. Consequently, the amount of ion supply corresponding to the ions that reaches point E from the first plasma generator 110*a* and the amount of ion supply corresponding to the ions that reaches point C may be controlled to be substantially equal to Y'. In the same way, the amounts of ion supply at points B and D may be controlled by adjusting the bias potentials of segmented electrodes β and δ. In addition, in the similar way, as illustrated in FIG. 4A, the amounts of ion supply corresponding to the ions that reaches points A to E may be controlled to be substantially equal to Y' by adjusting the voltages applied to the corresponding segmented electrodes at the particular active-glow time point $t_B$ of the second plasma generator 110*b*.

The controller 130 may control the aforementioned plurality of plasma generators 110*a* and 110*b*. For example, the controller 130 may properly control power level, start point of the ON state, pulse repetition frequency, pulse width, pulse duty cycle of the pulsed power deposited to the plasma generator 110, phase difference between the plurality of power pulses, and the like. In addition, the controller 130 may control voltage characteristics for the aforementioned plurality of segmented electrodes 160. For example, the controller 130 may individually control time-varying magnitudes of the voltages supplied to the plurality of segmented electrodes 160.

The system 1 for controlling plasma uniformity using multi-pulsing may optionally include a magnetic filter 150.

The magnetic filter 150 is installed between the plasma generator 110 and the ion supply unit 120 and configured to produce a magnetic field. The magnetic filter 150 may be installed on connection parts 151*a* and 151*b* through which the plasma generator 110 and the ion supply unit 120 are connected. In addition, the magnetic filter 150 may be placed in the vicinity of the plasma generator 110 or the ion supply unit 120. The magnetic filter 150 may be configured to produce the magnetic field to restrict the high-energy electrons, which are generated in the plasma generator 110 in the active-glow state, from entering the ion supply unit 120. Thus, the negative ion density in the ion supply unit 120 may be maintained at a high value, and the continuous supply of the negative ions may be promoted.

The magnetic filter 150 may include a plurality of magnetic filters 150*a* and 150*b* that may use electromagnets, permanent magnets, or the like. The plurality of magnetic filters 150*a* and 150*b* may be configured as magnetic filters with various combinations. In this case, the electromagnet magnetic filter may include an electromagnet and a power supply for the electromagnet, and operate while being interlinked with (or being synchronized with) the plasma generator power supply, which offers the power pulse information including the phase difference, by the controller 130, thereby controlling the magnitude of the magnetic field depending on the operating state of the plasma generator 110. For example, the electromagnet magnetic filter may produce the magnetic field when the corresponding plasma generator 110 is in the active-glow so as to prevent the high-energy electrons, which are generated in the corresponding plasma generator 110, from moving to the ion supply unit. Of course, the electromagnet magnetic filter may produce a static magnetic field that does not change in intensity or direction over time, or the electromagnet magnetic filter may operate with a delay with respect to a particular time.

The permanent magnet magnetic filter may have advantages of being simply installed and restricting the high-energy electrons at lower cost compared to the electromagnet magnetic filter.

Instead of installing the magnetic filter 150, it may also be possible to diffuse or transport the ions and ion precursors to the ion supply unit 120 while controlling the electron temperature by changing the volume or shape of the plasma generator 110 or the ion supply unit 120 or changing the size or shape of the connection parts 151*a* and 151*b* between the plasma generator 110 and the ion supply unit 120.

With reference to FIG. 1C, the plurality of segmented electrodes 160 may be available in the dualized or multi-structured version to locally control the electric fields between points a to e and points A to E. In FIG. 1C, the top electrode 160 and the bottom electrode 190 may be positioned with an ion irradiation target, such as a wafer (not illustrated), interposed therebetween in the ion supply unit 120. Only one of the top and bottom electrodes 160 and 190 may be provided as a plurality of segmented electrodes, or both the top and bottom electrodes 160 and 190 may be provided as a plurality of segmented electrodes. For example, the method of segmenting illustrated in FIG. 6 or 7 may be employed identically or differently to both the top and bottom electrodes. For example, the ion irradiation target or substrate may be placed on the single bottom electrode 190 positioned at a lower side in the ion supply unit 120, and above that, the plurality of segmented top electrodes 160 may be positioned at an upper side in the ion supply unit 120. The system 1 for controlling plasma uniformity using multi-pulsing described above with reference to FIG. 1C may be used to effectively tackle a problem that the ion irradiation target is not able to be placed on the plurality of segmented electrodes 160 represented in FIG. 1A due to different electrode voltages. For example, if a metallic material as the ion irradiation target is placed on the plurality of segmented electrodes applied at different voltages for a process and then the system operates, unwanted short-circuiting may occur because the material is conductive. Therefore, the system or the voltage supply device may be broken down. However, a short circuit or breakdown may not occur when the substrate is disposed at a lower side in the ion supply unit and the plurality of segmented top electrodes is used or when the substrate is placed on the single bottom electrode and the plurality of segmented top electrodes is used.

Depending on the application purpose, a substrate (not illustrated) itself may simply be placed in place of the single bottom electrode 160*b* positioned at a lower side in the ion supply unit 120 in FIG. 1C. In this case, the plurality of segmented electrodes 160 is not dualized or multi-structured, and the plurality of segmented electrodes 160 is positioned only at an upper side in the ion supply unit 120 and locally controls the electric fields between points a to e and points A to E on the substrate.

The aforementioned principle of the system 1 for controlling plasma uniformity using multi-pulsing in FIGS. 1A and 1B may be applied to the components identical to the components of the system 1 for controlling plasma uniformity using multi-pulsing in FIGS. 1A and 1B among the components of the system 1 for controlling plasma uniformity using multi-pulsing in FIG. 1C. In addition, a part of the aforementioned descriptions of the graphs in FIGS. 2A and 2B illustrating the profiles of pulsed powers delivered to the plurality of plasma generators and profiles of time-varying voltages applied to the plurality of segmented electrodes to control the distribution of the amount of negative ion supply and amount of positive ion supply, the graph in FIG. 3A illustrating the amount of negative ion supply over time at positions when the preset pulsed powers and electrode voltages are applied, the graph in FIG. 3B illustrating the time evolutions of negative ion densities at positions in the ion supply unit when the preset pulsed powers are delivered, the graph in FIG. 4A illustrating the amount of positive ion supply over time at positions when the preset pulsed powers and electrode voltages are applied, and the graph in FIG. 4B illustrating the time evolutions of positive ion densities at positions in the ion supply unit when the preset pulsed powers are delivered may be applied to the system 1 for controlling plasma uniformity using multi-pulsing in FIG. 1C. The principle of the present technology, which is to be considered, is to control the amount of ion supply at positions A to E by locally controlling the time-varying magnitudes of the electric fields between points a to e and points A to E.

Figure 5A:
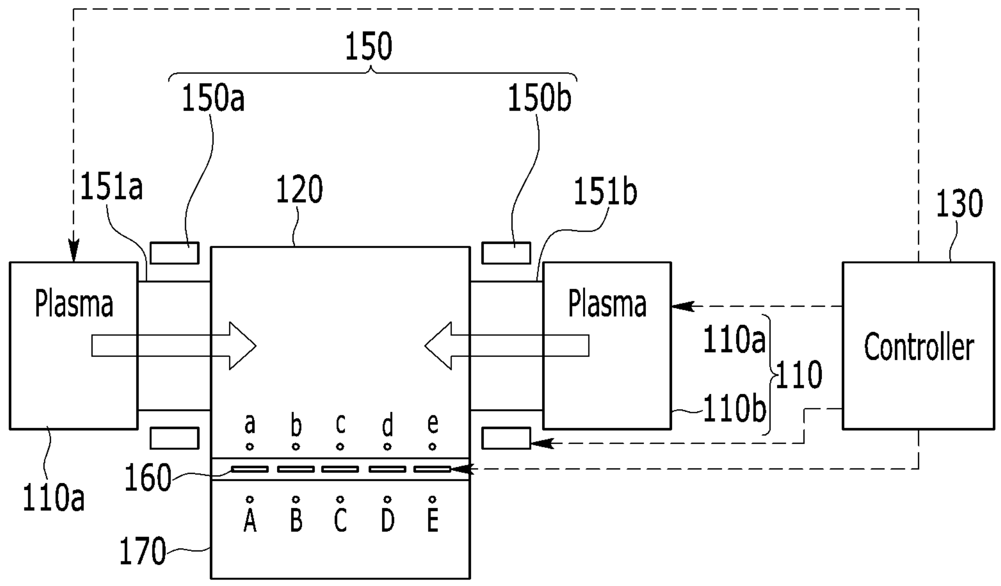
FIG. 5A is a cross-sectional view schematically illustrating a system for controlling plasma uniformity using multi-pulsing according to the embodiment.
Figure 5B:
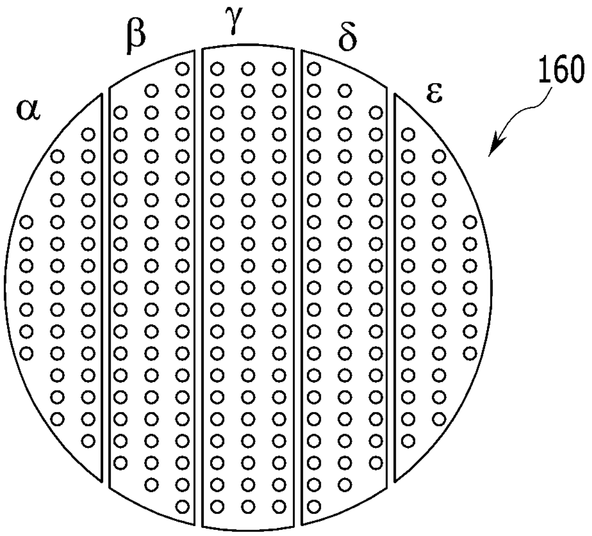
FIG. 5B is a top plan view illustrating a plurality of segmented electrodes in the system depicted in FIG. 5A.

FIG. 5A is a cross-sectional view schematically illustrating the system for controlling plasma uniformity using multi-pulsing, which may be used when use of ion beams or use of ions and ion beams in a space different from the ion supply unit is necessary, according to the embodiment, and FIG. 5B is a top plan view illustrating the plurality of segmented electrodes in the system depicted in FIG. 5A.

With reference to FIGS. 5A and 5B, the system 1 for controlling plasma uniformity using multi-pulsing may include an ion processing unit 170. The ion processing unit 170 may be a space in which ion beams having uniformity controlled by the plurality of segmented electrodes 160 are used through extraction. In addition, the plurality of segmented electrodes 160 may each have a plurality of holes, and the ion beams having the controlled uniformity may be extracted from the ion supply unit 120 to the ion processing unit 170 through the plurality of holes. The plurality of holes may be variously configured in terms of shape, size, number, position, and arrangement. In addition, the plurality of segmented electrodes 160 may include therein a space in which a coolant flows. Thus, cooling efficiency of the plurality of segmented electrodes 160 may be improved.

The aforementioned descriptions of the system 1 for controlling plasma uniformity using multi-pulsing in FIGS. 1A and 1B may be applied to the components identical to the components of the system 1 for controlling plasma uniformity using multi-pulsing in FIGS. 1A and 1B among the components of the system 1 for controlling plasma uniformity using multi-pulsing in FIGS. 5A and 5B. In addition, the aforementioned descriptions of the graphs in FIGS. 2A and 2B illustrating the profiles of pulsed powers delivered to the plurality of plasma generators and profiles of time-varying voltages applied to the plurality of segmented electrodes to control the distribution of the amount of negative ion (beam) supply and amount of positive ion (beam) supply, the graph in FIG. 3A illustrating the amount of negative ion (beam) supply over time at positions when the preset pulsed powers and electrode voltages are applied, the graph in FIG. 3B illustrating the time evolutions of negative ion densities at positions in the ion supply unit when the preset pulsed powers are delivered, the graph in FIG. 4A illustrating the amount of positive ion (beam) supply over time at positions when the preset pulsed powers and electrode voltages are applied, and the graph in FIG. 4B illustrating the time evolutions of positive ion densities at positions in the ion supply unit when the preset pulsed powers are delivered may be applied to the system 1 for controlling plasma uniformity using multi-pulsing in FIGS. 5A and 5B. The ions may be supplied in the form of beams at points A to E.

Figure 6:
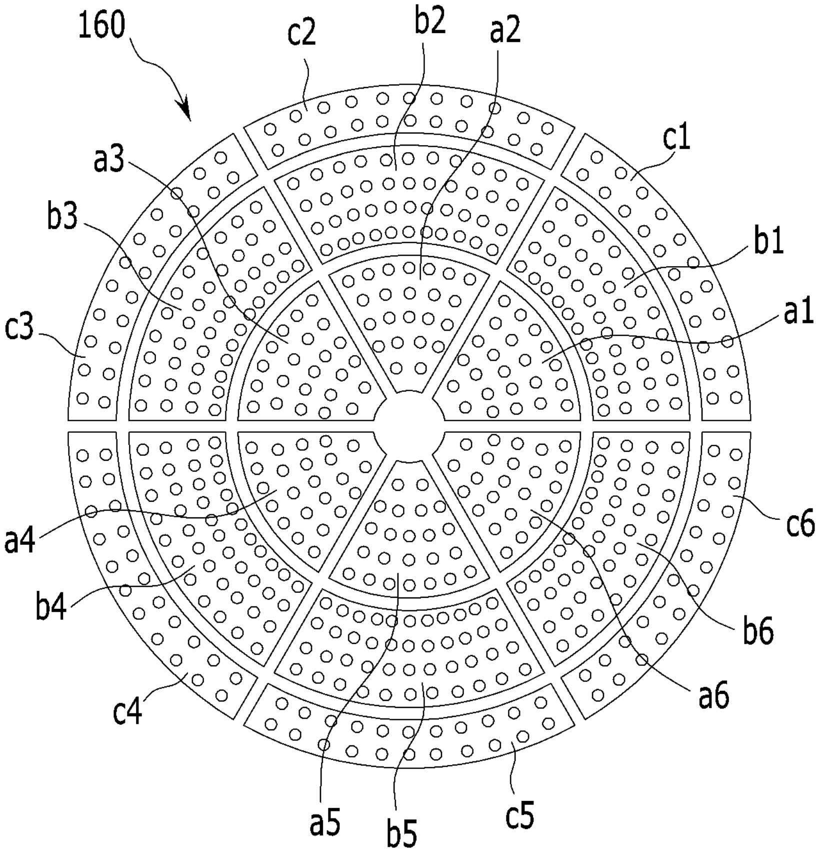
FIG. 6 is a top plan view illustrating a plurality of segmented electrodes in the system for controlling plasma uniformity using multi-pulsing according to the embodiment.

FIG. 6 is a top plan view illustrating the plurality of segmented electrodes in the system for controlling plasma uniformity using multi-pulsing, which may be used when control of the radial and azimuthal distributions of the amount of ion (beam) supply is necessary, according to the embodiment.

With reference to FIG. 6, the plurality of segmented electrodes 160 may include eighteen segmented electrodes (a1 to a6, b1 to b6, and c1 to c6). The plurality of plasma generators (not illustrated) may include two to six plasma generators that surround the plurality of segmented electrodes 160, and generate the corresponding pulsed plasmas in an alternating manner by applying pulsed power with the phase difference between their respective pulses. The particular profiles of time-varying voltages are individually applied to the plurality of segmented electrodes (a1 to a6, b1 to b6, and c1 to c6) based on the phase difference information associated with the plasma generators by the controller 130, thereby controlling the amount of ion (beam) supply at various positions and hence distribution. For example, in order to control the amount of negative ion (beam) supply to have a uniform distribution, when the plasma generator positioned outside segmented electrode c1 is in the after-glow and the plasma generator positioned outside segmented electrode c4 is in the active-glow, the respective bias potentials applied to the plurality of segmented electrodes 160 may be set to be relatively more negative (−) in the order of segmented electrode c4, segmented electrode b4, segmented electrode a4, segmented electrode a1, segmented electrode b1, and segmented electrode c1, in the same manner as in FIG. 2A. On the contrary, when the plasma generator positioned outside segmented electrode c4 is in the after-glow and the plasma generator positioned outside segmented electrode c1 is in the active-glow, the respective bias potentials applied to the plurality of segmented electrodes 160 may be set to be relatively more negative (−) in the order of segmented electrode c1, segmented electrode b1, segmented electrode a1, segmented electrode a4, segmented electrode b4, and segmented electrode c4. Likewise, the profiles of time-varying voltages of segmented electrodes a2, b2, and c2, segmented electrodes a3, b3, and c3, segmented electrodes a5, b5, and c5, and segmented electrodes a6, b6, and c6 may be adjusted depending on the states of the plurality of plasma generators that may be positioned outside segmented electrodes c2 to 3 and c5 to 6. By doing that, the user may obtain the desired distribution of the amount of ion (beam) supply.

Figure 7:
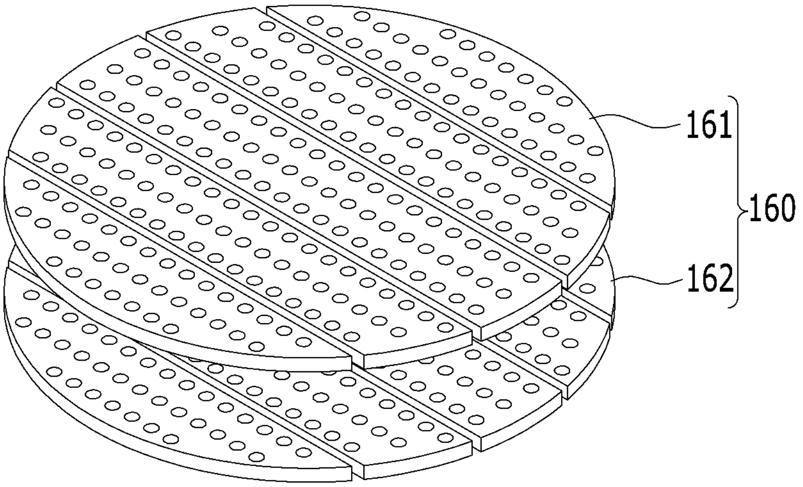
FIG. 7 is a perspective view illustrating a plurality of segmented electrodes according to the embodiment.

FIG. 7 is a perspective view illustrating the plurality of segmented electrodes when multi-structured electrodes are intended to be applied to the system for controlling plasma uniformity using multi-pulsing according to the embodiment.

With reference to FIG. 7, a plurality of segmented electrodes 161 in a first layer and a plurality of segmented electrodes 162 in a second layer are positioned at intervals in an upward/downward direction. In terms of extraction and acceleration of the ion beams, this structure may enable more flexible control in comparison with the plurality of segmented electrodes in a single layer. The plurality of segmented electrodes 161 in the first layer and the plurality of segmented electrodes 162 in the second layer may be configured by individually determining shapes, and their spacing intervals, voltages, and the like may be set. In addition, the plurality of segmented electrodes 160 may be configured in multiple layers, i.e., three or more layers.

In addition, the behaviors of electrons (beams), ions (beams), and the like may be controlled by adding a device for generating and controlling the magnetic field to the plurality of segmented electrodes 160. For example, it is possible to control electrons (beams), ions (beams), flux, and the like by installing an electromagnet or permanent magnet surrounding the plurality of segmented electrodes 160 or creating a magnetic field by applying an electric current to the plurality of segmented electrodes 160.

Figure 8:
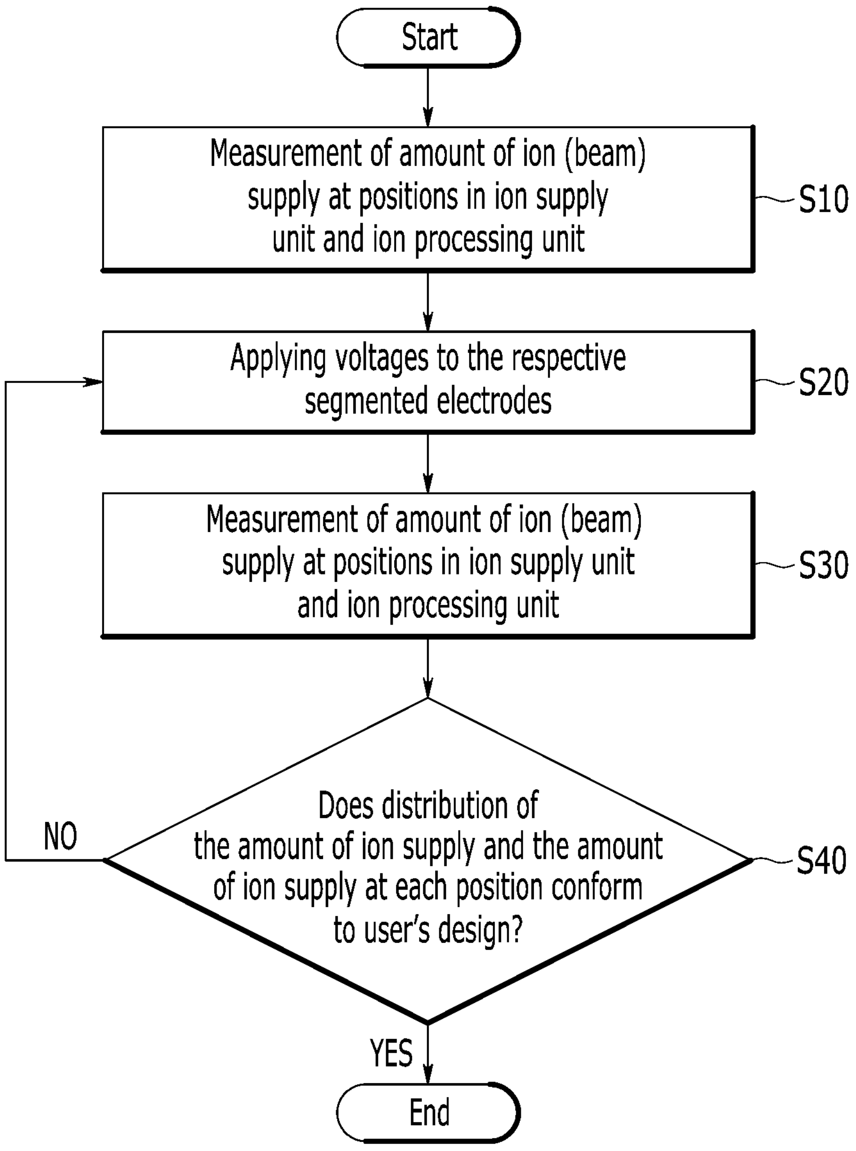
FIG. 8 is a flowchart illustrating a method of setting profiles of time-varying voltages applied to the respective segmented electrodes in a controller when a user intends to make a desired amount of ion (beam) supply and distribution over time on an electrode or substrate in the ion supply unit or in an ion processing unit.

FIG. 8 is a flowchart illustrating a method of setting profiles of time-varying voltages applied to the respective segmented electrodes in a controller when the user intends to make a desired amount of ion (beam) supply and distribution over time in the ion supply unit 120 or the ion processing unit 170. The aforementioned system 1 for controlling plasma uniformity using multi-pulsing in FIGS. 1 to 7 may be applied to the flowchart in FIG. 8.

The voltage profile setting for the segmented electrodes may be described with reference to FIG. 8. First, the user installs a diagnostic system for measuring the time-resolved amounts of ion (beam) supply (density, current, or flux) at points A to E (or the corresponding regions near points A to E), in the ion supply unit 120, corresponding to the segmented electrodes 160 in FIG. 1A or at points A to E (or the corresponding regions near points A to E) in the ion processing unit 170 in FIG. 5A. As a first step, the user measures the time-resolved amount of ion (beam) supply at each point for the total pulse period for obtaining the initial setting (S10). In this case, the amount ion (beam) supply may be measured by employing a diagnostic tool such as an electrostatic probe or a small-size Faraday cup. The user may obtain information on the time-resolved amounts of ion (beam) supply at positions and distribution based on the diagnostic data.

Next, voltages are individually applied to the plurality of segmented electrodes 160 (S20). The time-varying voltages may be individually applied to the plurality of segmented electrodes 160 by the controller 130. In addition, accordingly, the time-resolved amounts of ion (beam) supply at points A to E and distribution may be changed.

Next, changes in the time-resolved amounts of ion (beam) supply at positions and distribution due to the respective voltage variations are checked using the diagnostics for the total pulse period (S30).

Next, whether the changes in the amount of ion (beam) supply at positions and distribution conform to the user's goal is checked, and the corresponding optimal segmented electrode voltage profiles are explored through a feedback process (S40). When the time-resolved amounts of ion (beam) supply at positions and distribution conform to the user's design (YES), the segmented electrode voltage profiles set in step S20 are finally applied to the corresponding segmented electrodes 160. When the time-resolved amounts of ion (beam) supply at positions and distribution do not conform to the user's design (NO), the process returns back to step S20, the voltage profiles set in step S20 are modified, and then the modified voltage profiles are applied to the plurality of segmented electrodes 160.

In steps S10 and S30, a diagnostic system for measuring the time-resolved amounts of ion (beam) supply at points a to e (or the corresponding regions near points a to e) and distribution, corresponding to the segmented electrodes 160, may be additionally installed in the ion supply unit 120 in FIG. 1A or 5A, and based on information on the time-resolved amounts of ion (beam) supply at points a to e and distribution and the time-resolved amounts of ion (beam) supply of the ions moving from points a to e to points A to E, the exploration of the optimal segmented electrode voltage profiles in step S40 may be more efficiently performed.

Figure 9:
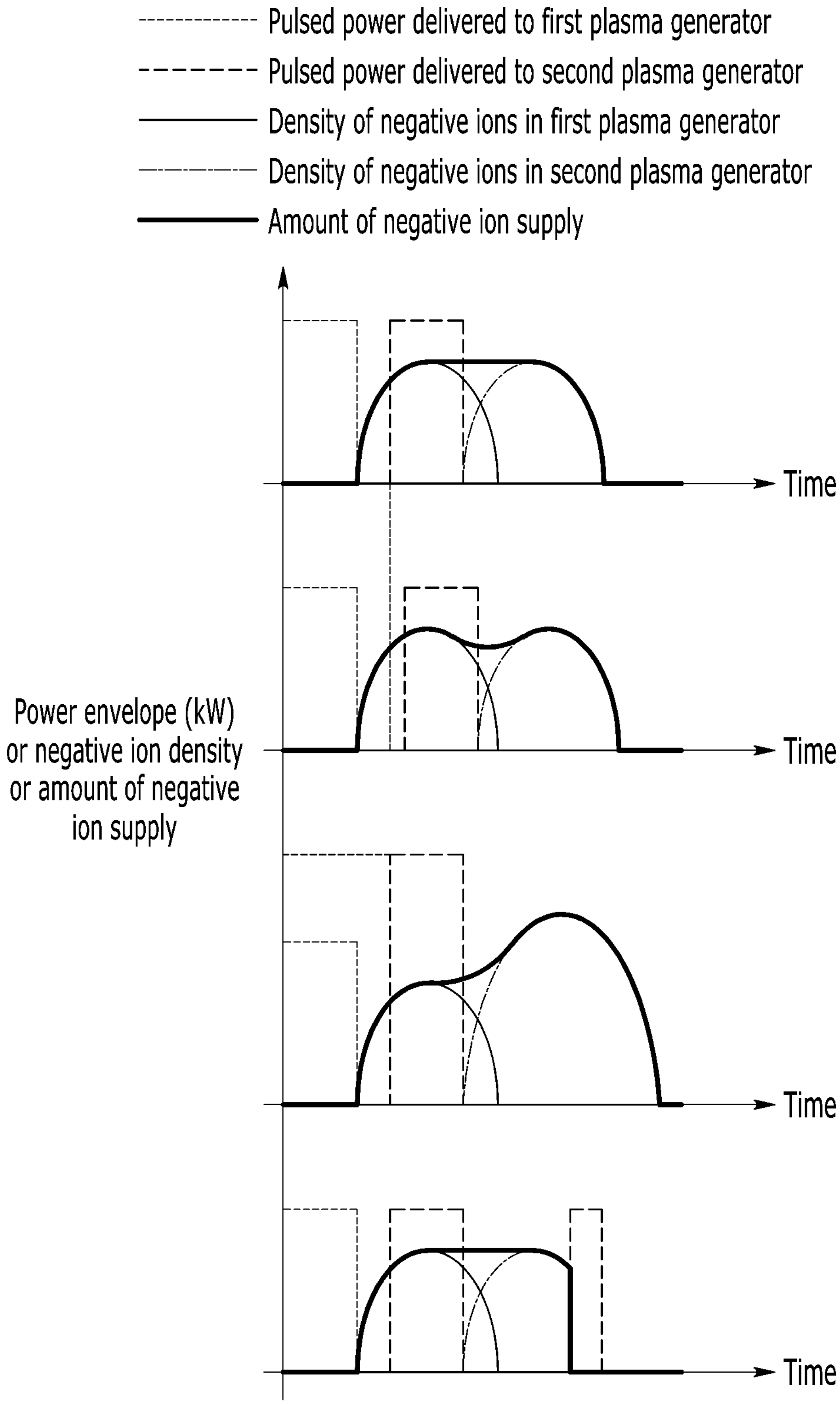
FIG. 9 is a graph illustrating various examples of shaping a profile of the amount of negative ion supply versus time using a multi-pulsed plasma source technology.

FIG. 9 is a graph illustrating various examples of shaping a profile of the amount of negative ion supply (or density) versus time using a multi-pulsed plasma source technology. The aforementioned system 1 for controlling plasma uniformity using multi-pulsing in FIGS. 1 to 7 may be applied to the graph in FIG. 9.

With reference to FIG. 9, in the ion supply unit, various shaping of the profile of the amount of negative ion supply versus time may be available by adjusting the number of plasma pulsing during a total pulse period, pulse sequence, power level, pulse width, phase difference between the pulses, pulse repetition frequency, and the like.

With reference to the first subgraph in FIG. 9, by delivering each pulsed power of a single pulse only once in the first plasma generator 110*a* and the second plasma generator 110*b* in an alternating manner, the time duration of ion supply may be extended compared to the case of using only a single plasma pulsing. In the first plasma generator 110*a* in the after-glow after power deposition is over, the density of negative ions generated in the first plasma generator 110*a* slowly increases and then slowly decreases. In this case, the pulsed power of the second plasma generator 110*b* having the same peak power and pulse width as those of the pulsed power of the first plasma generator 110*a*, is deposited with a constant phase difference. Then, like the first plasma generator 110*a* in the after-glow, the second plasma generator 110*b* in the after-glow, the density of negative ions generated in the second plasma generator 110*b* slowly increases and then slowly decreases. Because the negative ions generated in the first and second plasma generators 110*a* and 110*b* are supplied to the ion supply unit 120, the time evolution of the amount of negative ion supply in the ion supply unit 120 may have a profile similar to a superposition of both the amounts of negative ion supply from the plasma generators (or one showing the time duration of ion supply is more extended than that made by the single plasma generator). The time duration of ion supply in the ion supply unit 120 may be extended as desired by the user through this process control.

With reference to the comparison between the first subgraph and the second subgraph in FIG. 9, by increasing the phase difference between the power pulses related to the first and second plasma generators 110*a* and 110*b*, the profile of the amount of negative ion supply versus time may have a saddle shape. Further, on the contrary, by decreasing the phase difference between the power pulses related to the first and second plasma generators 110*a* and 110*b*, the profile of the amount of negative ion supply versus time may have an upwardly convex hill shape.

With reference to the comparison between the first subgraph and the third subgraph in FIG. 9, by setting the peak powers of pulsed powers deposited to the first and second plasma generators 110*a* and 110*b* to be different from one another, the profile of the amount of negative ion supply versus time has a shape that is asymmetric about the midpoint of the time duration of ion supply. For example, by setting the peak power of the pulsed power deposited to the second plasma generator 110*b* to be higher than that to the first plasma generator 110*a*, the profile of the amount of negative ion supply versus time has a saddle shape that the amount of negative ion supply for the period between the midpoint and the end point of the time duration of ion supply is larger than the amount of negative ion supply for the period between the start point and the midpoint.

With respect to the comparison between the first subgraph and the fourth subgraph in FIG. 9, there may be a method of depositing pulsed power to drastically reduce the supply of negative ions in the profile of the amount of negative ion supply versus time. For example, as seen in the fourth subgraph, if the pulsed power of a single pulse is deposited to the second plasma generator 110*b* once again for the corresponding period when the negative ion density slowly decreases in the second plasma generator 110*b* in the after-glow in the first subgraph, the state of the second plasma generator 110*b* may become the active-glow, such that the amount of negative ion supply may be rapidly reduced because a large number of high-energy electrons are generated, and thus the negative are destroyed in the active-glow.

Figure 10:
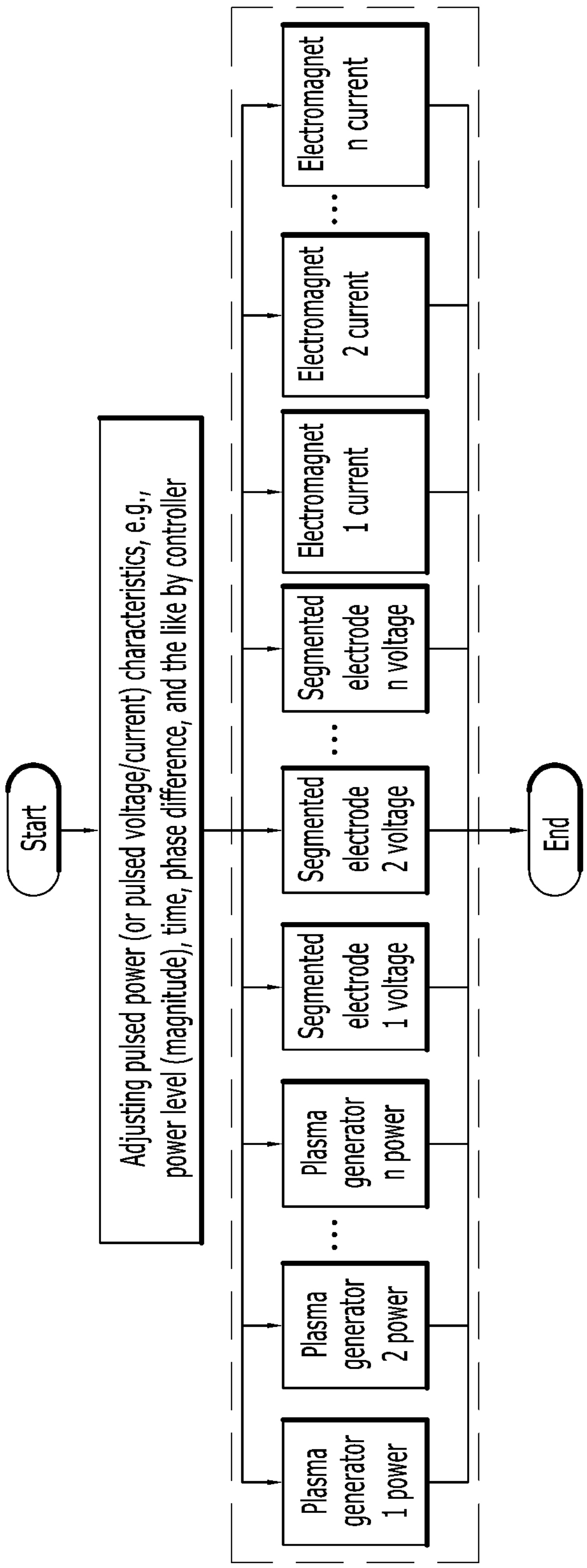
FIG. 10 is a flowchart illustrating a control diagram of the system for controlling plasma uniformity using multi-pulsing.

FIG. 10 is a flowchart illustrating a control diagram of the system for controlling plasma uniformity using multi-pulsing. The aforementioned system 1 for controlling plasma uniformity using multi-pulsing in FIGS. 1 to 7 and the graph in FIG. 9 may be applied to the flowchart in FIG. 10.

First, with reference to FIG. 10, the controller 130 adjusts the properties of the pulsed powers deposited to the plurality of plasma generators 110, segmented electrode voltages, electromagnet power (or current) and the like which may be varied over time. For example, the properties of the pulsed powers include the number of plasma pulsing during a total pulse period, pulse sequence, power level, pulse width, phase difference between the pulses, pulse repetition frequency, and the like.

Next, the adjusted pulsed powers may be deposited to the plurality of plasma generators 110, such that the profile of the amount of negative ion supply versus time which conforms to the user's design may be formed.

Further, in addition to the pulsed powers of the plasma generators 110, powers (or current) applied to the plurality of electromagnet magnetic filters, voltage characteristics related to the plurality of segmented electrodes, and the like may be selectively adjusted. By doing that, the system 1 for controlling plasma uniformity using multi-pulsing that offers the amount of ion (beam) supply for positions and distribution (or uniformity) as a function of time according to the user's design may be implemented, or more precise control of the profile of the amount of negative ion supply versus time may be available.

The system 1 for controlling plasma uniformity using multi-pulsing described with reference to FIGS. 1 to 10 may be applied to various technologies including the neutral beam injection device of the nuclear fusion reactor system, the plasma dry etching process technology, the ion thruster in the spacecraft propulsion field, and the ion source for an accelerator.

Although preferred examples of the present disclosure have been described in detail hereinabove, the right scope of the present disclosure is not limited thereto, and many variations and modifications of those skilled in the art using the basic concept of the present disclosure, which is defined in the following claims, will also belong to the right scope of the present disclosure.

The invention claimed is:

1. A system for controlling plasma uniformity, the system comprising:

a plasma generator configured to generate plasma by applying pulsed power to a plasma source gas;

an ion supply unit connected to the plasma generator and configured to receive and accommodate the plasma generated by the plasma generator;

a plurality of segmented electrodes positioned inside or below the ion supply unit and configured to be electrically isolated from each other and individually biased at voltages; and a controller configured to control the amount of supply of ions moving from the ion supply unit to the plurality of segmented electrodes, wherein the plurality of segmented electrodes comprises a first segmented electrode and a second segmented electrode, the first segmented electrode is positioned to be closer to the plasma generator than the second segmented electrode, and wherein electric potential applied to the second segmented electrode is higher than electric potential applied to the first segmented electrode when the plasma generator is in an after-glow state.

2. The system of claim 1, wherein:

the controller adjusts magnitudes of the voltages respectively applied to the plurality of segmented electrodes at a specific time.

3. The system of claim 1, wherein:

the plurality of segmented electrodes comprises a first segmented electrode and a second segmented electrode, the first segmented electrode is positioned to be closer to the plasma generator than the second segmented electrode, and electric potential applied to the second segmented electrode is lower than electric potential applied to the first segmented electrode when the plasma generator is in an active-glow state.

4. The system of claim 1, wherein:

the plurality of segmented electrodes each include a plurality of holes.

5. The system of claim 1, wherein:

the plurality of segmented electrodes is configured in multiple layers and includes a plurality of segmented electrodes in a first layer and a plurality of segmented electrodes in a second layer.

6. The system of claim 1, further comprising:

an ion processing unit configured to extract the ions.

7. The system of claim 1, further comprising:

a magnetic filter configured to generate a magnetic field to prevent high-energy electrons, which are generated by the plasma generator in an active-glow, from moving to the ion supply unit.

8. The system of claim 1, wherein:

the plasma generator or the ion supply unit has a shape that changes plasma electron temperature, which are involved in production and destruction of ions, for each position.

9. A system for controlling plasma uniformity, the system comprising:

a first plasma generator configured to generate first plasma by applying first pulsed power to a first plasma source gas;

a second plasma generator configured to generate second plasma by applying second pulsed power, whose pulse has a phase difference with respect to the first pulsed power pulse, to a second plasma source gas;

an ion supply unit positioned between the first plasma generator and the second plasma generator, connected to the first plasma generator and the second plasma generator, and configured to receive and accommodate the first plasma and the second plasma;

a first segmented electrode configured to be biased at a first voltage; and a second segmented electrode configured to be biased at a second voltage, positioned to be farther from the first plasma generator than the first segmented electrode, and positioned to be closer to the second plasma generator than the first segmented electrode, wherein in an after-glow state of the first plasma generator, the first voltage is more negative with respect to the second voltage, and the second plasma generator is in an active-glow state.

10. The system of claim 9, wherein:

when the second plasma generator is in the after-glow state, the first voltage has is more positive with respect to the second voltage, and the first plasma generator is in the active-glow state.

11. A method of controlling plasma uniformity, the method comprising:

measuring a distribution of an amount of ion supply or an amount of ion supply for each position in an ion supply unit or an ion processing unit corresponding to each segmented electrode at a specific time after plasma generated by a plasma generator is transported to the ion supply unit;

applying, by a controller, voltages individually to a plurality of segmented electrodes that is electrically isolated from each other; and determining whether the distribution of the amount of ion supply or the amount of ion supply for each position in the ion supply unit or the ion processing unit at a specific time conforms to a user's design based on changes in voltages of the plurality of segmented electrodes.

12. The method of claim 11, wherein:

the plasma generator generates plasma by multi-pulsing.

13. The method of claim 11, wherein:

the applying of the voltages individually to the plurality of segmented electrodes comprises controlling the amount of ion supply at each position by each of the plurality of segmented electrodes.

14. The method of claim 11, wherein:

when the distribution does not conform to the user's design, modified voltages are separately applied to the plurality of segmented electrodes.

* * * * *